(12) United States Patent
McAndrew

(10) Patent No.: US 10,293,794 B2
(45) Date of Patent: May 21, 2019

(54) INTEGRATED ON-BOARD VEHICLE VISION AND CLEANING SYSTEM

(71) Applicant: KAUTEX TEXTRON GMBH & CO. KG, Bonn (DE)

(72) Inventor: Paul McAndrew, Caerphilly (GB)

(73) Assignee: KAUTEXT TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 15/529,105

(22) PCT Filed: Nov. 23, 2015

(86) PCT No.: PCT/EP2015/077385
§ 371 (c)(1),
(2) Date: May 24, 2017

(87) PCT Pub. No.: WO2016/083317
PCT Pub. Date: Jun. 2, 2016

(65) Prior Publication Data
US 2017/0259789 A1    Sep. 14, 2017

(30) Foreign Application Priority Data
Nov. 24, 2014 (DE) .................. 10 2014 117 165

(51) Int. Cl.
*B60S 1/56* (2006.01)
*B60S 1/52* (2006.01)
*G02B 27/00* (2006.01)

(52) U.S. Cl.
CPC ............... *B60S 1/528* (2013.01); *B60S 1/56* (2013.01); *G02B 27/0006* (2013.01)

(58) Field of Classification Search
None
See application file for complete search history.

(56) References Cited

U.S. PATENT DOCUMENTS

| 8,671,504 B2 | 3/2014 | Ono et al. |
| 9,505,382 B2 | 11/2016 | Gokan |

(Continued)

FOREIGN PATENT DOCUMENTS

| CN | 201432644 | 3/2010 |
| CN | 201923085 | 8/2011 |

(Continued)

OTHER PUBLICATIONS

English translation of International Search Report dated Jan. 26, 2106, received in corresponding PCT Application No. PCT/EP2015/077385.

(Continued)

*Primary Examiner* — Michael E Barr
*Assistant Examiner* — Jason P Riggleman
(74) *Attorney, Agent, or Firm* — Grossman, Tucker, Perrault & Pfleger, PLLC

(57) ABSTRACT

The invention refers to integrated on-board vehicle vision and cleaning system comprising a casing being mounted in a vehicle bodywork, a viewing camera and a cleaning fluid nozzle associated with a nozzle carrier and communicating with a cleaning fluid source. The nozzle carrier is integrated into the casing and is moveable within the casing between first and second positions, the first position being a retracted position and the second position being an extended position which is the operating position. The nozzle carrier is designed as a sleeve encompassing the sensor unit.

11 Claims, 3 Drawing Sheets

(56) References Cited

U.S. PATENT DOCUMENTS

| | | | |
|---|---|---|---|
| 9,538,054 B2 | 1/2017 | Hayakawa et al. | |
| 9,783,167 B2* | 10/2017 | Niemczyk | B60S 1/528 |
| 2011/0073142 A1 | 3/2011 | Hattori et al. | |
| 2013/0048036 A1* | 2/2013 | Jonas | B08B 3/02 |
| | | | 134/167 R |
| 2014/0060582 A1 | 3/2014 | Hartranft et al. | |
| 2015/0344001 A1* | 12/2015 | Lopez Galera | B60S 1/56 |
| | | | 134/198 |

FOREIGN PATENT DOCUMENTS

| | | |
|---|---|---|
| CN | 102267419 | 12/2011 |
| DE | 10232227 | 1/2004 |
| EP | 1726498 | 11/2006 |
| EP | 2949521 | 12/2015 |
| FR | 2681031 | 3/1993 |
| WO | 2014/010578 | 1/2014 |
| WO | 2014/010580 | 1/2014 |
| WO | 2014/017405 | 1/2014 |

OTHER PUBLICATIONS

English translation of International Preliminary Report on Patentability dated Jun. 8, 2017, received in corresponding PCT Application No. PCT/EP2015/077385.

Third party observations filed in related EPO Appln. No. 15 798 125.9 dated Nov. 22, 2017.

EPO response to third party observations and Intent to Grant (including allowed application) from related EPO Appln. No. 15 798 125.9 dated May 8, 2018.

Office Action from related Chinese Appln. No. 201580063678.7, dated Sep. 25, 2018. English translation attached.

English translation of Decision for Grant of Patent from related Korean Appln. No. 10-2017-7016899, dated Jan. 17, 2019.

* cited by examiner

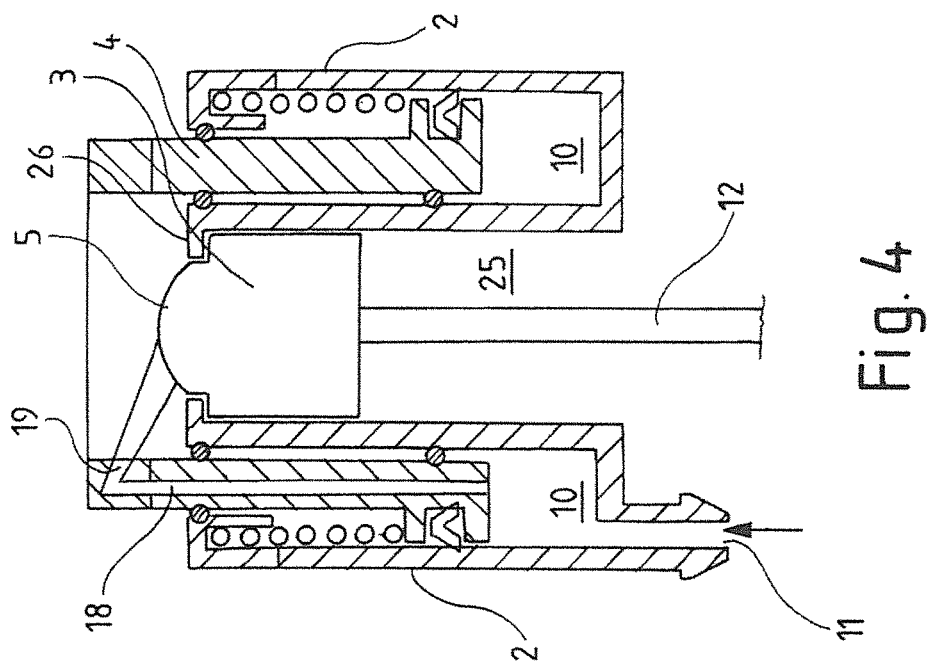
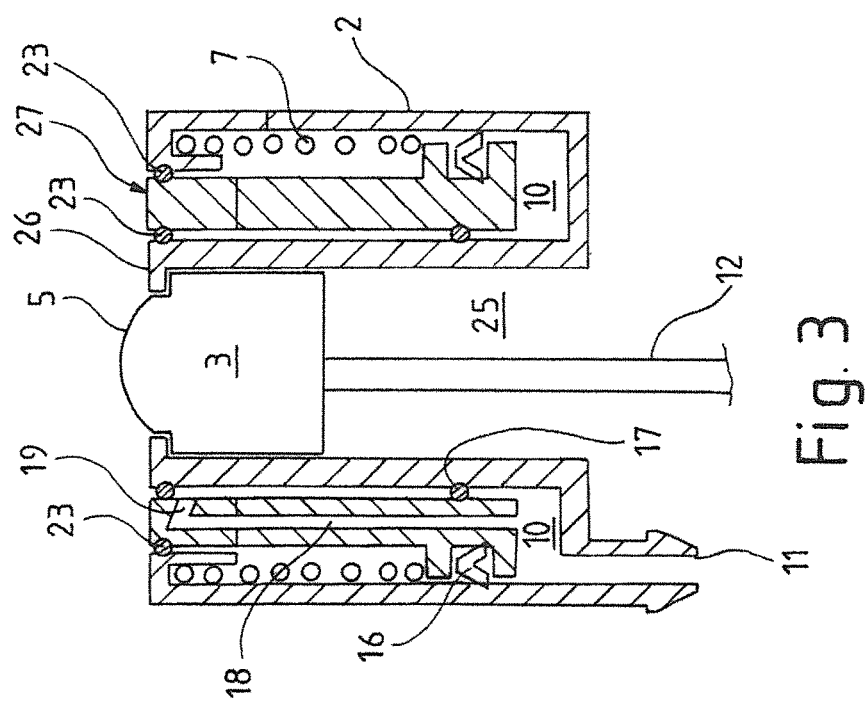

INTEGRATED ON-BOARD VEHICLE VISION AND CLEANING SYSTEM

FIELD

The invention refers to an integrated on-board vehicle vision and cleaning system comprising a casing being mounted in a vehicle bodywork, a sensor unit, a nozzle carrier, a cleaning fluid source, a cleaning fluid pump, a cleaning fluid circuit or a cleaning fluid conduit and at least one cleaning fluid nozzle associated with the nozzle carrier and communicating with the cleaning fluid source.

BACKGROUND

Modern vehicles, particularly automobiles, mostly so-called SUVs are provided with external view cameras to enhance the driver's vision and to improve safety. Moreover, these cars are often equipped with sensors which detect approaching and passing cars from behind which are not visible to the driver in the rear mirrors due to the blind angle, and are not covered by the rear view mirrors.

In the prior art, rear view cameras are often integrated into the rear bumper or into the tail gate or the boot lid of the vehicle nearby the licence plate. Due to that position at the car body, camera lenses or protective lens covers or the sensors are exposed to the vehicle's surroundings and dirt and debris, mud, salt spray etc. accumulate on the lens or on a lens cover or on a sensor cover during operation of the vehicle. Particularly, if cameras and/or sensors are integrated in the rear bumper or in the tail gate of the vehicle, they are particularly exposed to dirt and mud spray.

Therefore, it is generally known to provide external washing systems for cleaning lenses and sensors.

Various cleaning concepts have been proposed in the art, either in order to prevent built-up of dirt and debris on the camera lens, or to achieve an enhanced cleaning result.

Normally, cleaning fluid nozzles and nozzle assemblies are mounted on a vehicle adjacent to a camera or to a sensor, and are positioned such that liquid from the nozzles may directly sprayed onto the surface to be cleaned. As already mentioned in the very beginning, the surface to be cleaned might be a lens cover, a lens dome or a sensor surface.

Generally, an issue with such systems is that the external viewing angle of the sensor or of the vision device should be as wide as even possible. For example, modern wide angle rear view systems advantageously cover at least a part of the rear bumper such that a parking distance indication may be easily provided to the driver. The demand for such wide angle lens systems and for nozzles being placed very close to the lens or lens cover is to some extent conflicting as with rear view cameras it might happen that the nozzles are also covered by the viewing angle of the sensor unit. If a visible image is to be displayed on a screen within the passenger compartment, the nozzles might be optically distracting.

Yet another drawback of a non-concealed arrangement of nozzles very close to the sensor is that such arrangement is also aesthetically not very pleasing.

Yet another issue with known cleaning systems is that cleaning systems for cameras or sensors are provided in addition to cleaning systems for headlamp cleaning and windshield cleaning so that the cleaning liquid consumption is an issue. In modern vehicles the space available for cleaning fluid tanks is rather restricted which is generally not compatible with the demand for additional cleaning systems for cameras, sensors etc.

A known vehicle-mounted camera cleaning device which addresses the need to reduce the cleaning fluid consumption is for instance disclosed in WO 2014/010580 A1. This vehicle-mounted camera cleaning device includes a nozzle carrier in which an air channel and a cleaning fluid channel converge. The cleaning fluid with the aid of the compressed air is turned into a cleaning fluid mist, and thus, the cleaning fluid consumption is reduced.

Various other attempts to reduce the cleaning fluid consumption have been made, for example by fine tuning the spraying characteristics of the nozzles.

SUMMARY

Hence, it is an object of the current invention to provide an integrated on-board vehicle vision and cleaning system, where the cleaning fluid nozzles may be placed very close to the sensor unit without impairing the external view of the sensor, and which is designed simple and may be operated easily.

Moreover, it is an object of the current invention to provide such an on-board vehicle vision and cleaning system which is also aesthetically pleasing in terms that it does not impair the outer appearance of the vehicle.

Finally, it is an object of the current invention to provide an integrated on-board vehicle vision and cleaning system which has a relatively low cleaning fluid consumption.

In accordance with the present invention an integrated on-board vision and cleaning system is provided, the system comprising:
- a casing being mounted in a vehicle bodywork,
- a sensor unit,
- a nozzle carrier,
- a cleaning fluid source,
- a cleaning fluid pump,
- a cleaning fluid circuit or a cleaning fluid conduit,
- at least one cleaning fluid nozzle associated with the nozzle carrier and communicating with the cleaning fluid source, wherein the nozzle carrier is integrated into the casing and is moveable within the casing between first and second positions, the first position being a retracted position where the nozzle carrier is arranged below an external vehicle bodywork surface or in alignment with the external bodywork surface, the second position being an extended position, where the nozzle carrier projects from the external vehicle bodywork surface and wherein the second position is the operating position where the nozzle is aiming at an exposed surface of the sensor unit so that cleaning fluid may be propelled onto the exposed surface of the sensor unit in the operating position.

The invention aims to maintain a clear vision of the sensor unit by providing a nozzle carrier integrated into the casing of the sensor unit and being extendable and retractable. Once a cleaning cycle is triggered the nozzle carrier will be extended and projects from the external vehicle bodywork surface such that one or several nozzles are aiming at the exposed surface of the sensor unit and a cleaning fluid is propelled onto said exposed surface in order to perform a cleaning action. At the end of the cleaning cycle the nozzle carrier will be retracted so that it is arranged either below or in alignment with the external vehicle bodywork surface.

Preferably the sensor unit and the nozzle carrier are commonly arranged within the casing, thus forming an integrated system.

Since in the rest position the nozzle carrier is retracted, i.e. arranged below or in alignment with the external vehicle bodywork surface, the system does not interfere with the outer appearance of the vehicle and is thus very pleasing from an aesthetical aspect. Moreover, the nozzle carrier does only interfere with the viewing field or viewing angle of the sensor unit during the cleaning cycle. As the cleaning cycle may take only a few seconds, the cleaning action does not affect the function of the sensor unit.

The exposed surface of the sensor unit which is to be cleaned may flush with the vehicle's external surface and it is to be understood that generally the nozzle carrier in the rest position may also flush with the vehicle's external surface.

According to the inventive concept, the nozzle or several nozzles are generally arranged in a concealed fashion so that the nozzle or the nozzles are not exposed in the rest position of the nozzle carrier.

A sensor unit in the sense of the present application may be for example an external view camera or just a sensor for detecting approaching and passing cars or even for creating a lane departure warning signal.

A sensor unit in the sense of the present application may also be designed as an external view camera as well as a sensor at the same time to generate a lane departure warning to the driver or to detect object approaching the vehicle, which are normally not visible in the rear view mirror.

Moreover, a sensor unit in the sense of the current application may be for example a laser scanner which might be required for autonomous driving.

A sensor unit according to the present invention may be an image device using solid stage technologies, for instance CMOS or CCD pixel sensor technology in combination with for instance a video monitor display for automotive navigation systems, so-called sat-nav units. The sensor unit may comprise a camera lens system with at least one lens surface or cover surface. The lens surface or cover surface generally may have a circular or a rectangular shape. Generally, the sensor unit may include a dome-shaped lens cover.

A fluid nozzle in the sense of the present application may be a fluidic oscillator, a pencil jet nozzle or the like.

The fluid nozzle in the sense of the present application may also be an air nozzle, which may also be any type of nozzle through which an air jet, preferably a pencil jet may be ejected.

A cleaning fluid in the sense of the current application may be a liquid as well as gas or air.

A cleaning fluid pump according to the invention may be a conventional-type fluid pump, particularly an impeller pump with one or several impeller wheels. The fluid pump may have one or more fluid exit ports and at least one fluid entry port receiving a liquid cleaning fluid from the cleaning fluid source.

The on-board vision and cleaning system according to the current invention might benefit from a cleaning fluid source and a cleaning fluid circuit of an associated headlamp cleaning system or an associated windshield cleaning system.

The on-board vision and cleaning system according to the current invention might also include an airblast system to blast away any residual droplets of a cleaning liquid from the exposed surface of the sensor unit.

A cleaning fluid circuit in the sense of the current application may include a cleaning fluid conduit or cleaning fluid hoses as well as connectors and valves, i.e. check valves and/or pressure-retaining valves.

A cleaning fluid circuit in the sense of the present application does not necessarily has to be a closed circuit. A person skilled in the art will appreciate that the term "cleaning fluid circuit" includes also a single fluid conduit from the cleaning fluid pump to the fluid nozzle. A cleaning fluid circuit does not necessarily need to be and normally is not a closed loop.

In one advantageous embodiment of the integrated on-board vehicle vision and cleaning system according to the invention, it is provided that the nozzle carrier at least partially peripherally encompasses or conforms the sensor unit. That means that the outer contour of the nozzle carrier matches almost or completely the outer contour of the exposed surface of the sensor unit. Again, it should be mentioned that the outer contour of the sensor unit might be circular or rectangular. A person skilled in the art will appreciate that the outer contour of the sensor unit, i.e. the outer contour of the exposed surface of the sensor unit is not crucial to the invention.

In a preferred variant of the integrated on-board vehicle vision and cleaning system according to the invention the nozzle carrier is designed as an extendable and/or retractable sleeve.

In a more particularly preferred embodiment the nozzle carrier is arranged co-axially with the sensor unit.

Preferably, the nozzle carrier in the retracted position is aligned or flush with the external vehicle bodywork surface which is favourable insofar as the outer appearance of such arrangement is particularly appealing and the nozzle carrier in the retracted position does not impede the viewing angle of the sensor unit.

In a particularly advantageous embodiment the nozzle carrier comprises a rebound surface for ejected cleaning fluid, the rebound surface being arranged opposite the nozzle so that it may be hit either directly or indirectly by the cleaning fluid during a cleaning cycle. In this event the cleaning fluid will be bounced back onto the exposed surface, thus, ultimately reducing the cleaning fluid consumption during a cleaning cycle.

Advantageously, the nozzle carrier is designed as a preferably cylindrical sleeve at least partially encompassing the exposed surface of the sensor unit and the nozzle is provided at an inner circumferential wall of the nozzle carrier such that upon ejecting of the cleaning fluid a swirl effect is achieved by the nozzle carrier.

In this very favourable embodiment of the system according to the invention the nozzle carrier forms a kind of swirl pot in the extended position and during the cleaning cycle which also helps in reducing the cleaning fluid consumption.

The nozzle carrier may be spring-biased within the casing into the retracted position and may be advanced hydraulically or pneumatically by the pressure of the cleaning fluid once a cleaning cycle has been triggered.

For example, the nozzle carrier may be at least partially designed as a piston which engages the casing such that the piston and the casing define a sealed fluid chamber which communicates with the cleaning fluid circuit or the fluid conduit so that upon energization of the fluid pump cleaning fluid will enter the fluid chamber and will act on the piston so that ultimately the piston and thus the nozzle carrier will be advanced into the extended position against the biasing force of the spring.

As already mentioned before, the nozzle is preferably concealed in the retracted position of the nozzle carrier, for example arranged on an inner circumferential wall of the nozzle carrier so that the nozzle is sealed against the sensor unit or against the casing in the retracted position of the nozzle carrier.

For that purpose the inner circumferential wall of the nozzle carrier may be in sealing engagement with an outer circumferential wall of the sensor unit or with an inner circumferential wall of the casing.

For that purpose the outer circumferential wall of the sensor unit may be covered by an elastic coating.

Preferably, the nozzle carrier includes one or more cleaning fluid channels and even more preferably at least one cleaning fluid is integrally formed with the nozzle carrier.

The nozzle carrier as well as the casing might be in the form of an injection-molded thermoplastic part.

The one or more cleaning fluid channels within the nozzle carrier may comprise one or more check valves in order to make sure that cleaning fluid is only propelled in the event the nozzle carrier is fully extended.

The fluid pressure delivered by the cleaning fluid pump may be in the order of 2 to 5 bar, more preferably about 3 bar depending on the pressure consumption of the nozzle or an arrangement of several nozzles.

It should generally be emphasized that in the event the nozzle carrier is designed as a retractable sleeve, the design may not be limited to a full 360° revolve in order to create a swirling effect.

A person skilled in the art will appreciate that the above-referred integrated on-board vehicle vision and cleaning system has a very compact design and at the same time allows to arrange one or more fluid nozzles very close to the sensor unit, i.e. to the exposed surface of the sensor unit in order to perform a cleaning action without restricting the viewing angle of the sensor unit. Moreover, such a design has a pleasing outer appearance and allows to clean any dirt of vehicle cameras, sensors, laser scanners or the like with fluid, while using the least amount of fluid possible.

BRIEF DESCRIPTION OF THE DRAWINGS

The invention hereinafter will be described by way of example with reference to the accompanying drawings in which:

FIG. 3 shows a second embodiment of the on-board vehicle vision and cleaning system according to the invention with the nozzle carrier in the retracted position;

FIG. 4 shows a view of the integrated on-board vehicle vision and cleaning system according to FIG. 3 with the nozzle carrier in the extended position;

DETAILED DESCRIPTION

Figure 1:
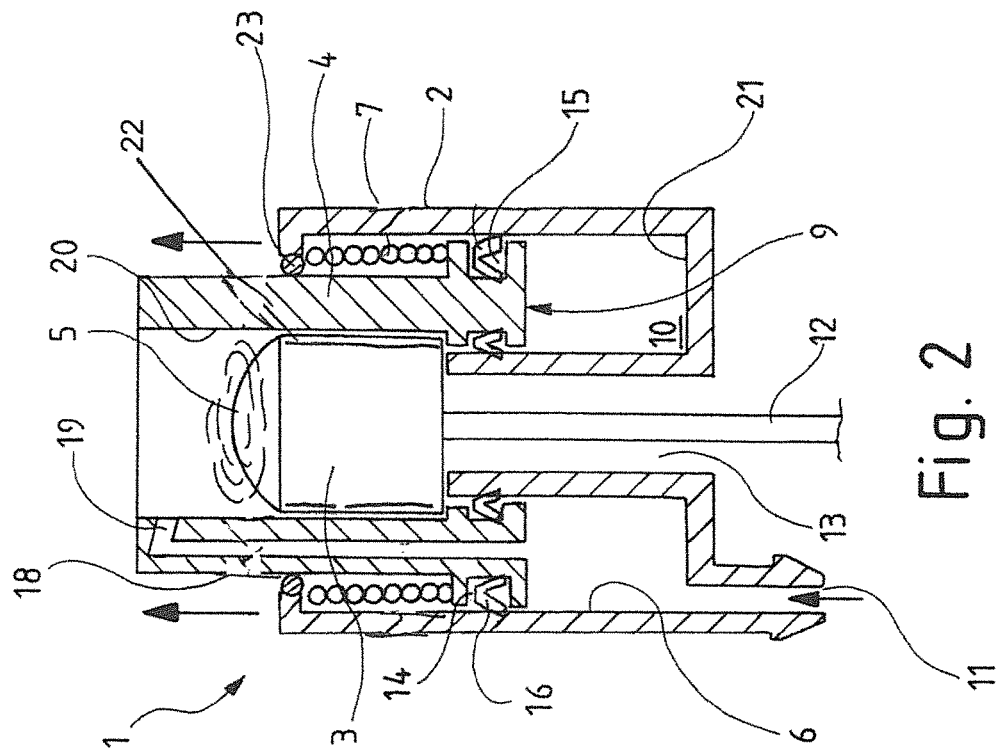
FIG. 1 shows a schematic view of the integrated on-board vehicle vision and cleaning system according to the invention with the nozzle carrier in the retracted position.

Turning now to FIG. 1, FIG. 1 shows a partial sectional view of a first embodiment of the integrated on-board vehicle vision and cleaning system 1 according to the invention. For the sake of simplification, the integrated on-board vehicle vision and cleaning system 1 hereinafter is referred to as the system. The system 1 includes a casing 2 in which a sensor unit 3 and a nozzle carrier 4 are arranged. The sensor unit 3 in the particular embodiment is a rear view camera with a dome-shaped lens cover 5 forming an exposed surface to be cleaned in accordance with the current invention.

The casing 2 comprising the sensor unit 3 and the nozzle carrier 4 forms an integrated unit which can be mounted onto or into the bodywork 30 of a vehicle such that the part of the casing 2 surrounding the exposed surface of the sensor unit 3 is in alignment or flush with a vehicle's external surface 32 also referred to as the external vehicle bodywork surface. For example, the casing may be fitted into a rear bumper or into a tailgate or into a boot lid of a passenger car so that the lens cover 5 is more or less exposed.

The nozzle carrier 4 is designed as a moveable piston which sealingly engages the interior walls 6 of the casing 2. Moreover, the nozzle carrier 4 sealingly engages an outer surface of the sensor unit 3 which will be hereinafter explained in more detail.

Figure 2:
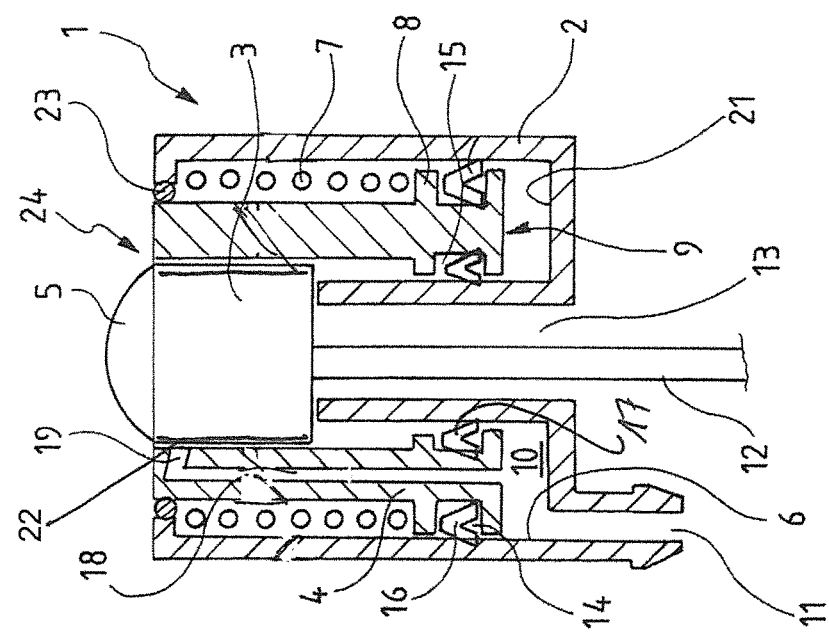
FIG. 2 shows a view corresponding to that in FIG. 1 with the nozzle carrier in the advanced position.

The nozzle carrier 4 according to the embodiment shown in FIGS. 1 and 2 is designed as a cylindrical sleeve which encompasses, i.e. conforms the sensor unit 3 tightly, and which is held in a retracted rest position within the casing 2 by a coil spring 7. The coil spring 7 is supported between the inner front side of the casing 2 and a circumferential outer ledge 8 of a piston base 9 of the nozzle carrier 4. Between the piston base 9 of the nozzle carrier 4 and the lower inner wall of the casing 2, there is defined a fluid chamber 10 which is in communication with an inlet port 11 of the casing 2. To the inlet port 11 a cleaning fluid hose (not shown) may be connected. The cleaning fluid hose in turn is either directly connected to a cleaning fluid pump or to a cleaning fluid circuit of a screen wash or headlamp wash system.

The sensor unit 3 is provided with terminals 12 for electrical connection of the sensor unit 3. The terminals 12 extend through a lead-through channel 13 which extends through the casing 2 and which is fluidly sealed towards the hydraulic part of the casing 2.

The piston base 9 of the nozzle carrier 4 includes an outer circumferential groove 14 and an inner circumferential groove 15, the outer groove 14 receiving a first piston seal 16, whereas the inner groove 15 of the piston base 9 receives a second piston seal 17.

The first and second piston seals 16 and 17 each engage the interior walls 6 of the casing 2 in order to seal the fluid chamber 10.

As this can be seen from FIGS. 1 and 2, the nozzle carrier 4 comprises an integrated fluid channel 18 which at the lower face of the piston base 9 opens into the fluid chamber 10 and which is connected to a nozzle 19 integrally formed with the nozzle carrier 4 and located at an inner wall 20 of the nozzle carrier 4.

As this has been already mentioned the nozzle carrier 4 of the embodiment according to FIGS. 1 and 2 has a circular cross-section and is designed as a cylindrical sleeve tightly encompassing the sensor unit 3 which also has a cylindrical cross-section. FIG. 1 shows the nozzle carrier 4 in its retracted position biased towards a bottom wall 21 of the casing 2. The nozzle 19 in this position is closed and sealed by the outer surface of the sensor unit which comprises a resilient coating 22 functioning as a sealing element.

The nozzle carrier 4 at its outer circumference is sealed against the casing 2 by an O-ring seal 23 located within an upper opening 24 of the casing 2. Of course the seal could be any type of seal.

The function of the system 1 will now be explained with reference to FIG. 2 which shows the nozzle carrier 4 in the extended position.

Once the cleaning fluid under pressure enters via the inlet port 11 the fluid chamber 10, the rising pressure within the fluid chamber 10 will force the nozzle carrier 4 upwards against the biasing force of the coil spring 7. Thus, the coil spring 7 will be compressed and the nozzle carrier 4 moves from the position shown in FIG. 1 into the extended position shown in FIG. 2. Once the nozzle carrier 4 is lifted up, the mouth hole of the nozzle 19 is not covered anymore by the outer surface of the sensor unit 3, and thus, the cleaning fluid may be ejected from the nozzle 19, if the nozzle carrier 4 has been advanced a certain amount.

As this is indicated in FIG. 2, cleaning fluid will hit the lens cover 5 and also will be rebounced from the inner wall 20 of the nozzle carrier 4, thus creating a swirling effect of the cleaning fluid within the confinements of the leading end of the nozzle carrier 4. Once the nozzle carrier 4 is in its cleaning position, i.e. the extended position, the nozzle 19 will clean any dirt/debris of the exposed surface of the sensor unit, i.e. of the lens cover 5.

When the fluid supply ceases the nozzle carrier 4 will move back down to its original stationary position as shown in FIG. 1.

The system 1 could generally be operated manually, when the car is put into reverse or automatically when the camera senses that it is dirty or once every number of times a rear wash system for the tail gate window of the car is activated.

FIGS. 3 and 4 show a slightly different concept of the system 1 according to the invention which in principle operates similar to the embodiment according to FIGS. 1 and 2. Same parts are denoted by same reference numerals.

For the sake of simplicity, in the following it will only be referred to the differences of the system 1 according to FIGS. 3 and 4 to the system according to FIGS. 1 and 2. Unless not explicitly mentioned, the design of the system 1 according to FIGS. 3 and 4 corresponds to the design according to FIGS. 1 and 2.

Apparently, with the design according to FIGS. 1 and 2, during assembly the sensor unit 3 is mounted from above, i.e. inserted through the opening 24 into the casing 2.

With the design according to FIGS. 3 and 4 generally the sensor unit 3 is inserted into the casing 2 from below. The casing 2 comprises a cylindrical sensor compartment 25 which is generally open at the lower end of the casing 2 and which at its upper end has a circumferential collar 26 which is inwardly directed and against which the sensor unit 3 abuts. The casing 2 forms an annular space in which the nozzle carrier 4 is inserted and against which the nozzle carrier 4 is sealed. Accordingly, the casing 2 in the embodiment of FIGS. 3 and 4 includes an annular opening 27 which is at the inner circumference and at the outer circumference at the leading end of the casing 2 sealed by two O-ring seals 23.

The piston base 9 of the nozzle carrier accordingly has only one outer groove 14 in which a first piston seal 16 is inserted. The second piston seal 17 is located between a smooth inner wall of the nozzle carrier 4 and its smooth inner wall of the annular space of the casing 2.

As with the embodiment according to FIGS. 1 and 2, the sensor unit 3 on its outer surface is also provided with a coating 22 acting as a seal.

The embodiments of the system 1 shown in FIGS. 1 and 2 on the one hand and shown in FIGS. 3 and 4 on the other hand could have a design of the nozzle carrier 4 where the leading end of the nozzle carrier 4 defines a confinement of the lens cover 5 which is a full 360° revolve in order to create the swirling effect. However, in FIGS. 6 and 7, a different design of the leading end of the nozzle carrier 4 is shown where the circumferential wall of the nozzle carrier 4 is interrupted, i.e. does not fully revolve 360°.

Figure 6:
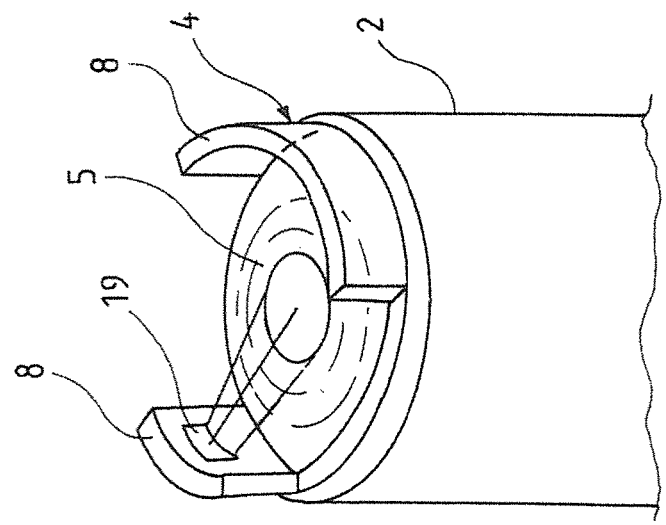
FIG. 6 shows a similar view to that of FIG. 5 with a different design of the nozzle carrier.
Figure 5:
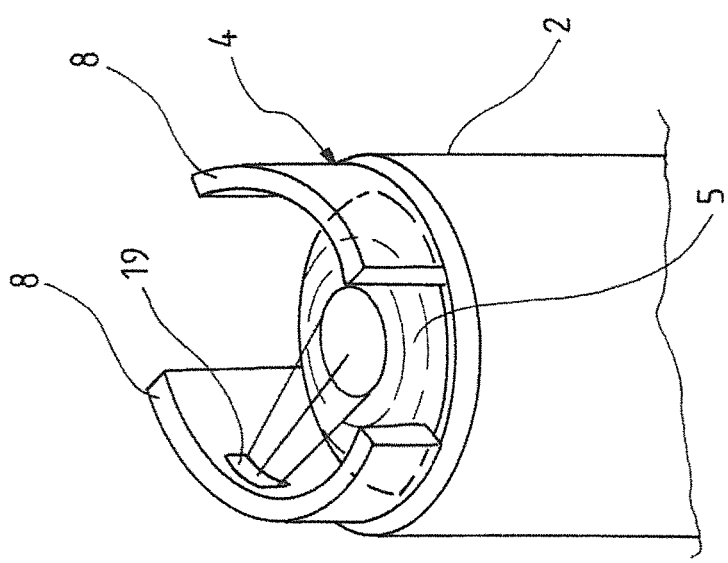
FIG. 5 shows a perspective view of the on-board vehicle vision and cleaning system with the extended nozzle carrier and not mounted to the vehicle.

In FIG. 6, the nozzle carrier 4 at its leading end rather comprises two circular segments one forming the nozzle 19 and the other one forming a rebound wall or rebound surface for the cleaning fluid. In FIG. 6, the two wall segments 28 define a circular arc of about 150°.

In the design according to FIG. 6 the segment comprising the nozzle 19 has only an arc of circle of about 30°, whereas the opposing segment which forms a reflection wall or rebound wall extends over an arc of circle of about 150°.

REFERENCE NUMERALS 1 integrated on-board vehicle vision and cleaning system
2 casing
3 sensor unit
4 nozzle carrier
5 lens cover
6 interior walls
7 coil spring
8 ledge
9 piston base
10 fluid chamber
11 inlet port
12 terminals
13 lead-through channel
14 outer groove of piston base
15 inner groove of piston base
16 first piston seal
17 second piston seal
18 fluid chamber
19 nozzle
20 inner wall of the nozzle carrier
21 bottom wall of the casing
22 coating
23 O-ring seal
24 opening in the casing
25 sensor compartment
26 collar
27 annular opening
28 wall segments

What is claimed is:

1. An on-board vehicle vision and cleaning system comprising:
a casing being mounted in a vehicle bodywork,
a sensor unit,
a nozzle carrier,
a cleaning fluid source,
a cleaning fluid pump,
a cleaning fluid circuit or a cleaning fluid conduit,
at least one cleaning fluid nozzle associated with the nozzle carrier and communicating with the cleaning fluid source,
wherein the nozzle carrier is integrated into the casing with the sensor unit and is moveable within the casing between a first position and a second position, the first position being a retracted position where the nozzle carrier is arranged below or in alignment with an external vehicle bodywork surface, and the second position being an extended position where the nozzle carrier projects from the external vehicle bodywork surface and wherein the second position is the operating position where the nozzle is aiming at an exposed surface of the sensor unit so that cleaning fluid will be propelled onto the exposed surface of the sensor unit in the operating position, and
wherein the nozzle carrier is moveable within the casing between the first position and the second position with motion along an axis, wherein the motion along the axis consists of linear motion.

2. The on-board vehicle vision and cleaning system according to claim 1, wherein the nozzle carrier at least peripherally encompasses the sensor unit.

3. The on-board vehicle vision and cleaning system according to claim 1, wherein the nozzle carrier is designed as an extendable and/or retractable sleeve.

4. The on-board vehicle vision and cleaning system according to claim 1, wherein the nozzle carrier is arranged co-axially with the sensor unit.

5. The on-board vehicle vision and cleaning system according to claim 1, wherein in the retracted position the nozzle carrier is aligned with the external vehicle bodywork surface.

6. The on-board vehicle vision and cleaning system according to claim 1, wherein the nozzle carrier comprises a rebound surface for ejected cleaning fluid, the rebound surface being arranged opposite the nozzle so that it may be hit either directly or indirectly by the cleaning fluid during a cleaning cycle.

7. The on-board vehicle vision and cleaning system according to claim 1, wherein the nozzle carrier is designed as a preferably cylindrical sleeve at least partially encompassing the exposed surface of the sensor unit, wherein the nozzle is provided at an inner circumferential wall of the nozzle carrier so that upon ejecting the cleaning fluid a swirl effect is achieved by the nozzle carrier.

8. The on-board vehicle vision and cleaning system according to claim 1, wherein the nozzle carrier within the casing is spring-biased into the retracted position and may be advanced hydraulically or pneumatically by the pressure of the cleaning fluid.

9. The on-board vehicle vision and cleaning system according to claim 1, wherein the nozzle carrier is designed as a piston which engages the casing such that the piston and the casing define a sealed fluid chamber which communicates with the cleaning fluid circuit or the fluid conduit.

10. The on-board vehicle vision and cleaning system according to claim 1, wherein the nozzle is concealed in the retracted position of the nozzle carrier.

11. The on-board vehicle vision and cleaning system according to claim 1, wherein the inner circumferential wall of the nozzle carrier is in sealing engagement with an outer circumferential wall of the sensor unit.

* * * * *